United States Patent [19]

Wurster

[11] Patent Number: 4,500,621
[45] Date of Patent: Feb. 19, 1985

[54] SENSITIVE ELECTROPHOTOGRAPHIC PLATES CONTAINING SQUARIC ACID METHINE DYES SUSPENDED IN A BINDER

[75] Inventor: Herbert K. Wurster, Los Gatos, Calif.

[73] Assignee: Ricoh Systems, Inc., San Jose, Calif.

[21] Appl. No.: 483,888

[22] Filed: Apr. 11, 1983

[51] Int. Cl.³ .............................................. G03G 5/06
[52] U.S. Cl. ........................................ 430/72; 430/70; 430/71; 430/76; 430/77; 430/78
[58] Field of Search ................. 430/58, 59, 70, 71, 430/72, 76, 77, 78

[56] References Cited

U.S. PATENT DOCUMENTS

| | | |
|---|---|---|
| 3,140,182 | 7/1964 | Heseltine et al. |
| 3,617,270 | 11/1971 | Kampfer et al. ..................... 430/92 |
| 3,816,118 | 6/1974 | Byrne . |
| 3,824,099 | 7/1974 | Champ et al. ........................ 430/58 |
| 4,123,269 | 10/1978 | Von Hoene et al. |
| 4,175,956 | 11/1979 | Haley et al. ........................ 430/37 |
| 4,353,971 | 10/1982 | Chang et al. ....................... 430/58 |

FOREIGN PATENT DOCUMENTS

| | | | |
|---|---|---|---|
| 2314867 | 10/1973 | Fed. Rep. of Germany | 430/58 |
| 57-144558 | 9/1982 | Japan | 430/59 |
| 1343671 | 1/1974 | United Kingdom | 430/58 |

OTHER PUBLICATIONS

"Reduction of Fatigue in Squarylium Particulate Photoconductor by Electron-Transport Doping", Balanson et al., IBM Tech. Discl. Bull, vol. 24, No. 11B, Apr. 1982, p. 6194.
"Photoconductivity of Organic Particle Dispersions: Squarine Dyes", Loutfy et al., PSE, vol. 27, No. 1, Jan.-Feb. 1983, pp. 5-9.
Merritt, V. Y., *IBM J. Res. Develop.*, 22 (Jul. 1978), "Organic Photovoltaic Materials: Squarylium and Cyanine-TCNQ Dyes".

Primary Examiner—Roland E. Martin
Attorney, Agent, or Firm—Flehr, Hohbach, Test, Albritton & Herbert

[57] ABSTRACT

Electrographic imaging process and electrographic plates utilized therein are provided wherein the photoconductive layer comprises a squaric acid methine dye admixed with a binder or a photoconductive material. The photoconductive layer may also comprise the squaric acid methine dye, a binder and a charge transport material.

8 Claims, 4 Drawing Figures

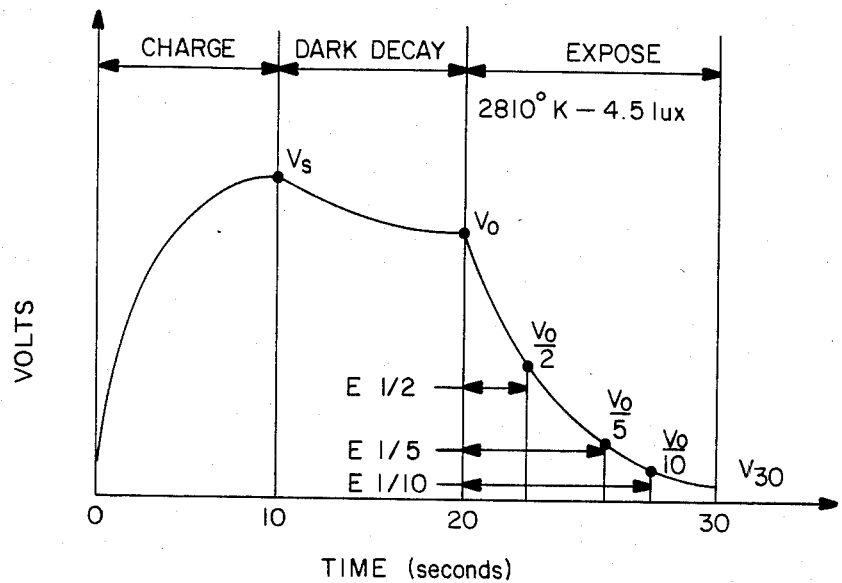
FIG.—1
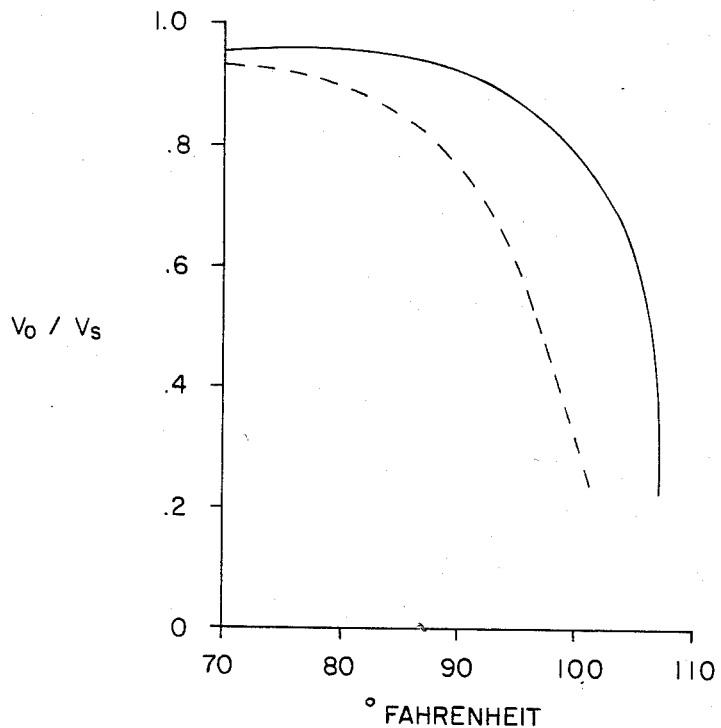
FIG.—2

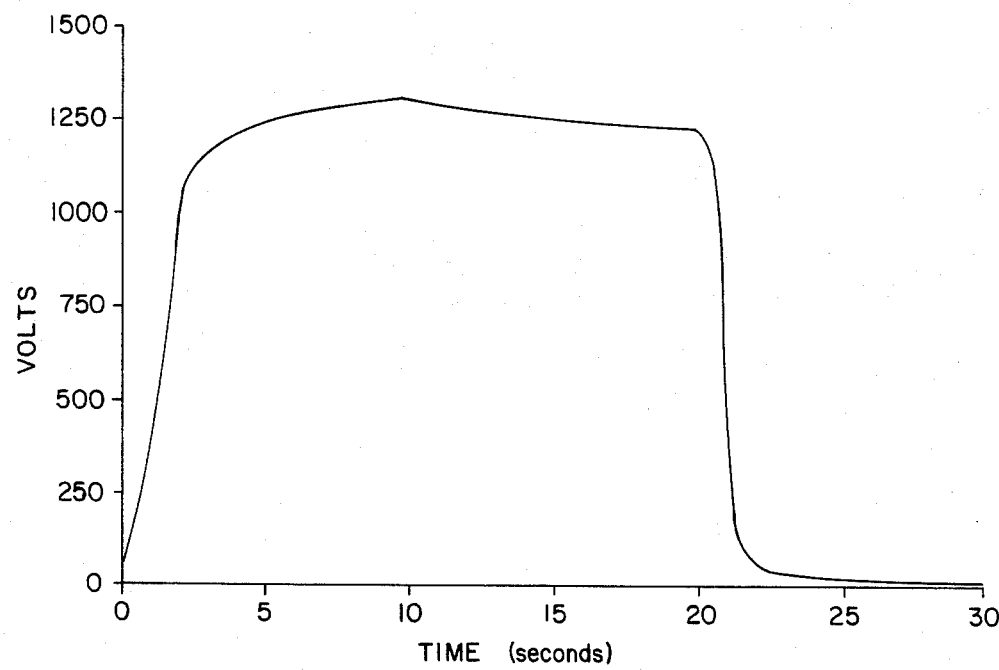
FIG.—3
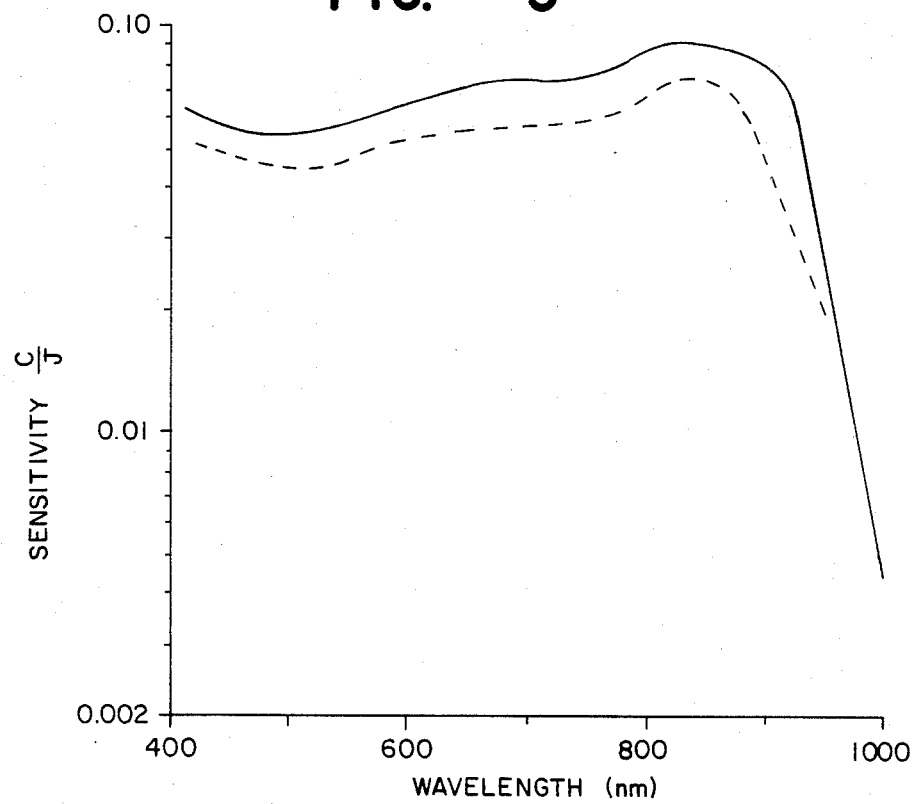
FIG.—4

SENSITIVE ELECTROPHOTOGRAPHIC PLATES CONTAINING SQUARIC ACID METHINE DYES SUSPENDED IN A BINDER

The present invention is directed to an electrophotographic imaging method and electrophotographic plates utilizing photoconductors which are panchromatic and responsive to infrared light.

The formation and development of images on the imaging surfaces of photoconductive materials by electrostatic means is well-known. The best known of the commercial processes is commonly known as xerography, which involves forming an electrostatic latent image on the imaging surface of the imaging member by first uniformly electrostatically charging the surface of the imaging layer in the dark and then exposing this electrostatically charged surface to an image-wise pattern of activating electromagnetic radiation. The light-struck areas of the imaging layer are thus rendered relatively conductive and the electrostatic charge is selectively dissipated in these irradiated areas. After the photoconductor is exposed, the electrostatic laden image is typically rendered visible with a finely divided color marking material known in the art as toner. Various types of photoreceptors are known for use in electrophotographic copying machines. For example, there are known in the art photoreceptors wherein the charged carrier generation and charged carrier transport functions are performed by discreate contiguous layers. There are also known in the art photoreceptors which include an overcoating layer of an electrically insulating polymeric material. However, improvements in the art of xeroxography requiring more stringent performance are continually needed. The present invention is directed therefore to novel electrophotographic plates comprising a single photosensitive and photoconductive layer, thereby eliminating the need for a discreate charge carrier transport layer.

Furthermore, attendant to the rapid growth of improvements in the field of electrostatic imaging, the word processing and electronic data processing industry which utilizes electronic printers also is a source of continuing improvements. One aspect of electronic printing is the development of laser diode which emits light at approximately 800 nm. However, before such laser diodes may be utilized on a commercial scale, new photoreceptors sensitive in the infrared region of the spectrum must be produced. It is thus also an object of the present invention to provide photoconductive materials which are sensitive in the infrared region.

U.S. Pat. No. 3,617,270 discloses the use of squaric acid methine dyes for the optical sensitization of zinc oxide. U.S. Pat. Nos. 3,824,900; 3,837,851; 4,123,270 and 4,150,987 disclose the use of squaric acid methine dyes for a conventional charge generation layer with a p-type charge transport layer in a layered electrophotographic plate.

In the accompanying figures:

FIG. 1 is a graph of a model time-voltage plot of a plate tested on a conventional static charge analyzer.

FIG. 2 is a plot of dark decay v. temperature of two photoconductors according to the present invention which were cured under two diffent sets of conditions.

FIG. 3 is a time-voltage plate of an electrophotographic plate made in accordance with Example 3.

FIG. 4 is a time-voltage plot of the sensitivities of electrophotographic plates containing squaric acid methine dye No. 1 and No. 1A prepared in accordance with Example 5.

The present invention is directed to electrographic imaging processes and electrographic plates utilizing a photoconductive layer comprising a squaric acid methine dye selected from the group consisting of compounds of the formula I.

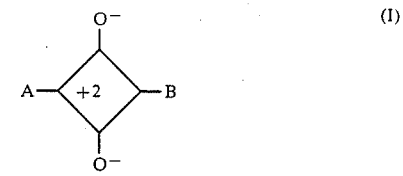

wherein A and B are independently,

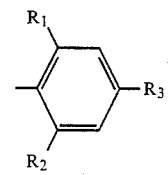

wherein $R_1$, $R_2$, $R_3$ are independently H, OH or alkyl of 1 to 6 carbon atoms, $NR_4R_5$, wherein $R_4$ and $R_5$ are independently alkyl of 1 to 6 carbon atoms;

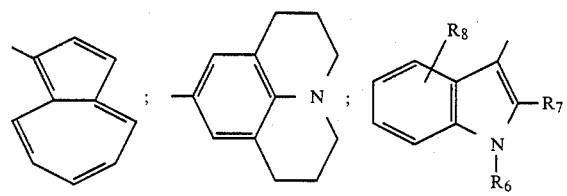

wherein $R_6$ and $R_7$ are independently alkyl of 1 to 6 carbon atoms; and $R_8$ is independently H, $OR_9$ or halogen, wherein $R_9$ is alkyl of 1 to 6 carbon atoms;

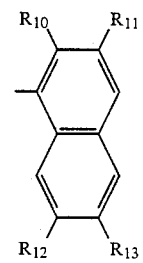

wherein $R_{10}$, $R_{11}$, $R_{12}$ and $R_{13}$ are independently H, OH or alkyl of 1 to 6 carbon atoms;

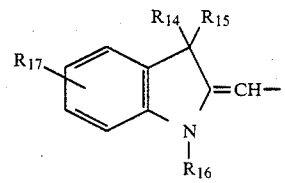

wherein $R_{14}$, $R_{15}$ and $R_{16}$ are independently alkyl of 1 to 6 carbon atoms; and $R_{17}$ is independently H, $OR_{18}$ or halogen, wherein $R_{18}$ is alkyl of 1 to 6 carbon atoms; or

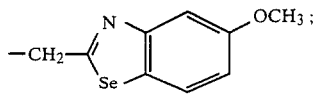

and a suitable binder intermixed with said dye.

The single layer squaric acid methine dye/binder organic photoreceptor according to the present invention demonstrate charge acceptance values of greater than 800 volts, residual potential of less than 100 volts, dark decay less than 20 volts/second with stable sensitivity under cycling conditions. The spectral response of the photoreceptor is in a range from about 400–900 nm. These and other characteristics of the organic photoreceptors according to the present invention render them useful in electrophotographic processes, including use as photoreceptors and in laser diode printing processes.

The squaric acid methine dyes used as photoreceptors in the present invention include those of the following structure. Formula I:

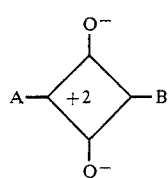

wherein A and B are described hereinabove.

Related squaric acid methine dyes have been disclosed as useful in electrophoretic migration imaging processes in U.S. Pat. No. 4,175,956, however that patent does not disclose use of squaric acid methine dyes as a single layer photoreceptor useful in electrophotographic processes without necessity of a charge transport layer.

General methods for the preparation of squaric acid methine dyes are known and are disclosed in, for example, Treibs et al., *Angew. Chem. Internat. Ed.*, 4, 695 (1965); Sprenger et al, *Angew. Chem. Internat. Ed.*, 5, 894 (1966); and Treibs et al., *Leibig's Ann. Chem.*, 712, 123 (1968), disclosures of which are incorporated herein by reference in their entirety. Generally, squaric acid is reacted with the desired carbocyclic or heterocyclic compound in a suitable solvent with heating. The product is isolated by cooling the reaction mixture to obtain cyrstals or by adding thereto a nonsolvent for the dye.

A preferred class of squaric acid methine dyes are those according to the formula I wherein A and B are independently substituted or unsubstituted phenyl as set forth above. A particularly preferred squaric acid methine dye is that wherein $R_1$ is methyl, $R_2$ is hydrogen and $R_3$ is dimethylamino.

The particles sizes of the squaric acid methine dyes are preferably in the range of about 2–30 millimicrons in diameter. The particular particle size distribution may depend upon the reprecipitation process, milling time and solvents used to prepare the dye. Generally, with decrease of particle size the charge acceptance and sensitivity of the photoreceptor increases while the residual and dark decay is decreased.

The solvent which is used to prepare the dye-binder preparation is selected on the basis of polymer-binder solubility and volatility. Solvents which may be utilized to prepare the dye-binder slurries include ethers, cyclic ethers, halogenated hydrocarbons, ketones, aliphatic solvents, and aromatic solvents. A preferred class of solvents comprises tetrahydrofuran, chloroform, methylene chloride, carbon tetrachloride, acetone, benzene and toluene. Tetrahydrofuran and methylene chloride are particularly preferred solvents because of excellent dispersive characteristics and high volatility. Variation in solvent or solvent mixtures may be used to alter the electrical properties of the coatings due to variation in polarities and drying times. Concentration of the dye-binder suspension may be adjusted to viscosities which insure suitable coating characteristics. For example, generally in dye-binder ratios varying from 1:3 to 1:10, the solvent concentrations used to prepare the slurries vary from approximately 90% to 78%, respectively.

The following Table 1 is a list of exemplary solvents used in the preparation of dye-binder ratio 1:6 coatings characterized by their electrical properties according to the parameters shown in FIG. 1. The binder in each case in Table 1 is Acryloid B66, a methyl/butyl methacrylate copolymer, manufactured by Rohm and Haas Co.

TABLE 1

| Solvent | THF | $CHCl_3$ | $CH_2Cl_2$ | $CCl_4$ | Acetone | Benzene | Toluene |
|---|---|---|---|---|---|---|---|
| $V_o$ | 1250 | 1100 | 1080 | 820 | 760 | 420 | 60 |
| $V_o/V_s$ | .96 | .92 | .93 | .71 | .75 | .55 | .10 |
| $V_{30}$ | 0 | 20 | 110 | 20 | 10 | 20 | 0 |
| Thickness (μm) | 38 | 30 | 25 | 28 | 46 | 34 | 33 |

The parameters $V_o$, $V_s$ and $V_{30}$ are determined from a plot as shown in FIG. 1 on a Princeton Static Charge Analyzer Model 276.

The photoconductor is coated on aluminum substrate and two samples (1"φ) are rotated on a turntable that rotates past (i) an exposure window, (ii) two charging coronas, and (iii) three electrometer probes at 600 rpm.

The photoconductor is charged positively by the charge corona at a preselected current, which were for Table 1 50 μA. The potential on the photoconductor surface is recorded and plotted on a graph as exemplified in FIG. 1. The potential at the end of the charging period is recorded as $V_s$. The sample is then allowed to dark decay for a period of 10 seconds. The potential at the end of dark decay is recorded as $V_o$. The sample is then illuminated with incandescent light at a color temperature of 2810° K. and a surface illuminance of 4.5 lux. The exposures in lux/seconds for discharge to $V_o/2$, $V_o/5$ and $V_o/10$ may be determined and recorded as $E_{\frac{1}{2}}$, $E_{1/5}$ and $E_{1/10}$, respectively. The potential at the end of 10 seconds discharge is recorded as $V_{30}$. The dark decay is measured as the ratio $V_o/V_s$.

The photoconductor material according to the present invention is prepared as a suspension of dye in a solution of an appropriate binder. The binder may be selected from a variety of polymers, for example, Epoxy-Epon 1007 F (a 4,4'-isopropylidene diphenolepichlorohydrin resin manufactured by Shell Chemical Co.) Acryloid-B66 (a methy/butyl methacrylate copolymer manufactured by Rohm and Haas Co.). Vylon-200 (a polyester resin manufactured by Toyob Co., Japan), Panlite L-1250 and K1300 (a polycarbonate resin manufactured by Teijin Co., Japan), polyurethane.

polystyrene and Luvican (a Polyvinylcarbazole manufactured by BASF).

The dye to binder ratio in the photoconductor may be in the range from about 1:1 to about 1:40. Preferably, dye to binder ratio should be in the range of 1:2 to 1:10, most preferably at 1:6.

The thickness of the photoconductor layer is preferably 1–60 microns, but thickness outside of this range may be useful as well.

The electrophotographic properties of the photoconductors according to the present invention are dependent upon the film thickness of the photoconductor which is placed upon the substrate. Generally, as thickness of the photoconductor layer is increased, the induction period, charge acceptance (defined as $V_s$) and residual potential (defined as $V_{30}$) increase, while dark decay ($V_o/V_s$) decreases. Shown below in Table 2 are the various electrophotographic properties of a 1:6 dye to binder photoconductor utilizing squaric acid methine dye No. 1a, as described hereinbelow, and Acryloid B66 as binder, wherein the thickness of the film was varied from 11 to 38 micrometers.

TABLE 2

| Thickness μm | $V_o$ | $V_o/V_s$ | $V_{30}$ | relative $E_{\frac{1}{2}}$ | relative $E_{1/5}$ |
|---|---|---|---|---|---|
| 11 | 500 | .80 | 5 | N/A | N/A |
| 14 | 660 | .84 | 10 | 3.7 | 5.0 |
| 19 | 790 | .87 | 10 | 4.0 | 5.0 |
| 38 | 1260 | .97 | 20 | 4.8 | 5.3 |

The film surface qualities of the photoconductor are particularly advantageous if a trace amount of surfactants, usually in the amount of about 0.01% to 1% by weight is added. Furthermore, by increasing the drying time of the dye-binder suspension the resultant films have a smoother surface and improved initial potential and dark decay. A preferred surfactant is a commercial surfactant FC430 (3M Company).

The electrophotographic characteristics of the photoconductors according to the present invention are particularly advantageous if a charge transport material is included in the photoconductor mixture. The charge transport material may be admixed with the binder wherein about 2% to 50% charge transport material is used based, on weight of binder. For example, a binder mixture of 2:1 binder/charge transport material utilized in a photoconductor having a dye/binder ratio of 1:7, the sensitivity of the photoconductor is more stable than the sensitivity of a photoconductor having 1:6 dye/binder ratio with no charge transport material. Exemplary charge transport materials may be triphenylamine (TPA), isopropylcarbazole, methylphenylhydrazono-3-methylidene-9-ethyl carbazole, 1-phenyl-3-(4-diethylaminostyryl)-5-(4-diethylaminophenyl)-2-pyrazoline, triphenylmethane, triphenylene, pyrene and perylene. The squaric acid methine dye may also be included in a single layer admixed with other known metallic charge transport materials, such as selenium or selenium alloys, with or without a binder.

Exemplary squaric acid methine dyes useful according to the present invention include, but are not limited to, the following:

(1) 2,4-bis-(2-methyl-4-dimethylaminophenyl)-1,3-cyclobutadienediylium-1,3-diolate
(2) 2,4-bis-(p-dimethylaminophenyl)-1,3-cyclobutadienediylium-1,3-diolate
(3) 2,4-bis-(2,4,6-trihydroxyphenyl)-1,3-cyclobutadienediylium-1,3-diolate
(4) 2,4-bis-(2-hydroxy-4-dimethylaminophenyl)-1,3-cyclobutadienediylium-1,3-diolate
(5) 2,4-bis-(1-azulenyl)-1,3-cyclobutadienediylium-1,3-diolate
(6) 2,4-bis-(p-jujolidenyl)-1,3-cyclobutadienediylium-1,3-diolate
(7) 2,4-bis-(2-hydroxy-4-diethylaminophenyl)-1,3-cyclobutadienediylium-1,3-diolate
(8) 2,4-bis-(1,2-dimethylindolenyl-3-)1,3-cyclobutadienediylium-1,3-diolate
(9) 2,4-bis-(2,3-dihydroxynaphthyl)-1,3-cyclobutadienediylium-1,3-diolate
(10) 2-(4-dimethylaminophenyl)-4-(2-methyl-4-dimethylaminophenyl)-1,3-cyclobutadienediylium-1,3-diolate
(11) 2,4 -bis-(2-methyl-4-diethylaminophenyl)-1,3-cyclobutadienediylium-1,3-diolate
(12) 2,4 -bis-(2-methyl-5-chloroindolen-3-yl)-1,3-cyclobutadienediylium-1,3-diolate
(13) 2,4 -bis-(2-methyl-5-methoxyindolen-3-yl)-1,3-cyclobutadienediylium-1,3-diolate
(14) 2,4 -bis-(1,3,3-trimethyl-5-chloroindol-2-yl)-1,3-cyclobutadienediylium-1,3-diolate
(15) 2,4 -bis-(p-diethylaminophenyl)-1,3-cyclobutadienediylium-1,3-diolate The following examples are presented by way of illustration and are not intended to limit the scope of the present invention.

EXAMPLE 1

Preparation of Photoconductors Containing Squaric Acid Methine Dyes No. 1, No. 2, and No. 4.

One gram of each of the methine dyes identified above as nos. 1, 2, and 4, was micronized dry for 1 hour and, after the addition of 19 grams THF, for 1 hour wet, to give 5% by weight slurries. With each freshly prepared slurry, a coating was made using dye/binder ratios of 1:6 (i.e., 2 grams, 5% slurry and 1.5 grams, 40% 1007F epoxy resin) at a wet gap of 0.006 inches and curing at 80° C. for 10 minutes and 100° C. for 5 minutes. Each of the photoconductors were tested on a Princeton Static Charge Analyzer Model 276 using a charge current of 50 μA and 3.0 ND filter. The results are shown below in Table 3.

TABLE 3

| Dye | Film Thickness μm | $V_o$ | $V_o/V_s$ | $V_{30}$ | E-½ | E-1/5 |
|---|---|---|---|---|---|---|
| 2 | 30 | 651 | .69 | 23 | .81 | 1.89 |
| 4 | 31 | 1040 | .89 | 30 | 3.8 | 10.0 |
| 1 | 38 | 1030 | .90 | 3 | 1.1 | 1.4 |

EXAMPLE 2

Preparation of Two Forms of Squaric Acid Methine Dye No. 1.

Recystallized squaric acid (0.05 mole) with 50% excess of N,N-dimethyl-m-toluidine-(0.15 mole) are refluxed in 100 ml toluene for 20 minutes. Then 50 ml of n-pentanol are added dropwise and the mixture refluxed for 2 hours (115° C.). After cooling, the solvent is filtered off and the solid is washed thoroughly with ethanol. The filtrate is refluxed for an additional 2.5 hours, the products combined and dried under vacuum for 8 hours to give a yield of 56%. Doubling the amount of starting materials gave a yield of 53% and scale up to 10 times gives 43% yield. This product is identified above as squaric methine dye No. 1. A sample of 20 grams of squaric acid methine dye No. 1 are dissolved in 400 ml, 5N HCl. The solution is added dropwise to 1 liter 2N NaOH with stirring and cooling. This solid is filtered off, washed with water, and boiled in 500 ml of ethanol, filtered and dried under vacuum for 8 hours. The resulting dye is identified as squaric acid methine dye No. 1a. Dye 1 is the crystalline structure obtained from the condensation reaction and is used after dry milling for one hour and one hour of wet milling to obtain optimum electrophotographic properties. Dye 1a is smaller in particle size and is utilized after 10 minutes of wet milling only.

EXAMPLE 3

Photoconductive coatings containing squaric acid methine dye No. 1a were prepared by mixing 2 g of a micronized slurry (1 g of dye No. 1a/19 g THF) and 1.5 g 40% Epon Epoxy 1007 F in THF coating at a wet gap of 0.006 inches and curing at 80° C. for 30 minutes. The results of the testing of this photoconductor on a Princeton Static Charge Analyzer with charge acceptance of 1250 volts at 50 μA positive showed low dark decay, and a good sensitivity at 800 nm. The results of the test are shown in FIG. 3.

EXAMPLE 4

Preparation of photoconductor layer comprising dye No. 1 dispersed in selenium.

One part of powdered dye No. 1 is blended with 10 parts powdered selenium on an aluminum plate and spread in a uniform layer over the plate surface. The mixture is heated above the melting point of selenium to wet the dye particles, then the whole plate is quenched in water to prevent cyrstal growh of selenium. The plate exhibits improved infrared-sensitive response as compared to a pure selenium photoconductor.

EXAMPLE 5

The cycling and fatigue characteristics of dyes No. 1, and 1A.

One sample of each of the photoconductors containing dyes 1 and 1A were prepared on a 0.008" aluminum foil substrate. The thickness of the coating in each case were 35 micrometers and 30 micrometers, respectively. Each of the samples was mounted on a 120 mm. diameter bare drum for testing in the drum scanner. The drum is rotated at 30 rpm with the quench lamp at 53 volts. The photoconductors were rested in the dark over a weekend and then tested using bare plate current of of 54 microamps. They were rested for 24 hours and the photoconductors containing dyes 1 and 1A were tested again using a bare plate current at 70 microamps. The results are given below in Table 4.

The results in Table 4 show that photoconductors containing dyes 1 and 1A have stable cycling characteristics, i.e., both the initial potential and the residual potential after the quench lamp remain relatively stable with cycling.

TABLE 4

|  | DYE 1 | | DYE 1A | |
| --- | --- | --- | --- | --- |
| $V_o$ | 600 v | 780 v | 605 v | 760 v |
| $D_2$ sec. (rest) | 1% | 2% | 4% | 4% |
| $D_{10}$ sec. (rest) | 4% | 4% | 9% | 8% |

TABLE 4-continued

|  | DYE 1 | | DYE 1A | |
| --- | --- | --- | --- | --- |
| $V_R$ 1st cycle | 10 v | 10 v | 25 v | 25 v |
| $V_R$ 100th cycle | 25 v | 25 v | 50 v | 50 v |
| $V_o$ (Fatigue) | 630 v | 780 v | 605 v | 740 v |
| $D_2$ sec. (Fatigue) | 3% | 9% | 9% | 7% |
| $D_{10}$ sec. (Fatigue) | 10% | 8% | 24% | 20% |
| Charge current | 54 μa | 70 μa | 54 μa | 70 μa |

D = Dark decay
$V_R$ = Residual Potential
$V_o$ = Initial Potential

EXAMPLE 6

The spectral response curves of photoconductors containing dyes No. 1 and 1A were measured.

Photoreceptors 1 and 1A were prepared utilizing 2.86% by weight of dye, 17.14% by weight Shell EPON resin No. 1007 F and 80% by weight THF solvent. The sample was coated at a wet coat thickness of 0.006 inches on to a 0.008 inch aluminum foil substrate. The photoconductor was then cured for 60 minutes at a temperature of 80° C. The film thickness of the photoconductor containing dye No. 1 was 38 micrometers and that of the photoconductor containing dye No. 1A was 40 micrometers. Each sample was tested on a static charge analyzer, with the charge current set at 40 microamps for 10 seconds, then allowed to dark decay for 10 second and then discharged for 10 seconds by light of an appropriate wavelength. Narrow band interference filters were used to obtain discharge at wavelengths from 420 nm. to 950 nm. The discharge in coulombs per joule as a function of wavelength based on discharge from initial potential to 20% of initial potential is shown in FIG. 4. FIG. 4 shows the data for the photoconductor containing dye No. 1 (dotted line) and the data for photoconductor containing dye No. 1A (solid line). An estimated dielectric constant of 5 was used to calculate data. The data shows that the photoconductors exhibit sensitivity throughout the visible spectrum, extending into the infrared region where the peak in sensitivity occurs at about 800 to 850 nm.

EXAMPLE 7

Preparation of Dye No. 1A/Polycarbonate/Triphenylamnine Photoconductors.

1.4 g of dye No. 1A and 2.3 g of Triphenylamine are dry milled together for 10 minutes. 19.3 g of methylenechloride is added and the slurry micronized for 10 minutes. 31.3 g of a 15% Panlite L-1250 (polycarbonate resin from Teijin Co., Japan) in methylenechloride is added with 10 drops of 10% FC430 surfactant (3 M) in methylenechloride and the material micronized for 10 minutes. The slurry is then coated on 0.005" thick aluminum foil at a wet gap of 0.0075", cured at 80° C. for 40 minutes to give a film thickness of approximately 30 μm.

A 20,000 cycle electrical test was carried out on a dye/binder 1:5 coating made according to Example 7. This 31 μm thick film was coated on 0.005" aluminum foil, attached to a 120 mm drum, exposed to a black (subject) surface and to a white (background) surface. The respective voltages $V_B$ and $V_W$ were measured.

Conditions:
Bare Drum Current: 100 μA DC
Drum Speed: 30 rpm
Expose Lamp: Sylvania 625 W/90 V Lens: Itek with 1.6 Neutral Density Filter (uncoated lens)
Quench Lamp: 52.5 V, FT-6600 Assembly
Results:

| Cycle No. | $V_o$ | $V_B$ | $V_{H'}$ | $V_R$ | °F. |
|---|---|---|---|---|---|
| 1 | 840 | 740 | 110 | 30 | 68 |
| 5 | 840 | 740 | 110 | — | — |
| 10 | 840 | 740 | 110 | — | — |
| 200 | 840 | 740 | 110 | — | — |
| 400 | 830 | 740 | 110 | — | 68 |
| 2,700 | 820 | 720 | 110 | 50 | 73 |
| 6,300 | 820 | 720 | 110 | 40 | 73 |
| 10,000 | 800 | 690 | 110 | — | 75 |
| 12,000 | 800 | 680 | 110 | 60 | 75 |
| 16,000 | 820 | 680 | 120 | — | 74 |
| 19,900 | 810 | 680 | 120 | — | 75 |
| 20,000 | 840 | 740 | 120 | 40 | 68 |

What is claimed:

1. A single layer photoreceptor plate comprising a solid continuous photoconductor layer of uniform thickness in the range of 1-60 microns consisting essentially of a noncharge-transporting binder material and a charge-generating, charge-transporting squaric acid methine dye selected from the group consisting of compounds of the Formula I:

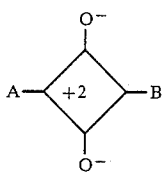
(I)

wherein A and B are independently,

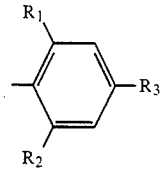

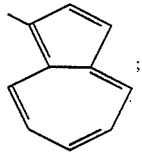

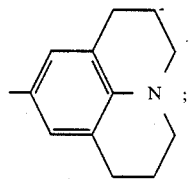

wherein $R_1$, $R_2$, $R_3$ are independently H, OH or alkyl of 1 to 6 carbon atoms, $NR_4R_5$, wherein $R_4$ and $R_5$ are independnetly alkyl of 1 to 6 carbon atoms;

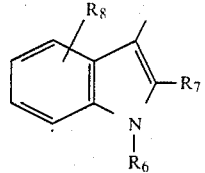

$R_6$ and $R_7$ are independently alkyl of 1 to 6 carbon atoms; and $R_8$ is independently H, $OR_9$ or halogen, wherein $R_9$ is alkyl of 1 to 6 carbon atoms;

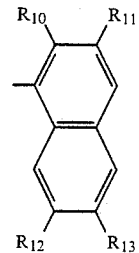

wherein $R_{10}$, $R_{11}$, $R_{12}$ and $R_{13}$ are independently H, OH or alkyl of 1 to 6 carbon atoms;

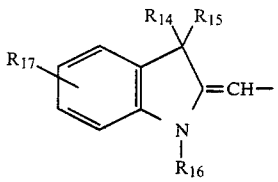

wherein $R_{14}$, $R_{15}$ and $R_{16}$ are independently alkyl of 1 to 6 carbon atoms; and $R_{17}$ is independently H, $OR_{18}$ or halogen, wherein $R_{18}$ is alkyl of 1 to 6 carbon atoms; or

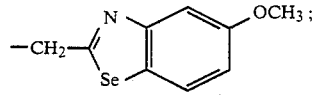

wherein the proportion of said dye to said binder material in said photoconductor is in the range of 1:1 to 1:40.

2. A photoreceptor plate according to claim 1 wherein A and B are independently

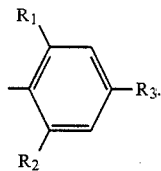

3. A photoreceptor plate according to claim 2 wherein $R_1$ is methyl, $R_2$ is hydrogen, $R_3$ is dimethylamino and A and B are the same.

4. A photoreceptor plate according to claim 1 wherein said binder is selected from the group consisting of polycarbonate resin, epoxy resins, and acrylic polymers.

5. An electrophotographic imaging process comprising the steps of subjecting a solid continuous photoconductor layer of a uniform thickness in the range of 1-60 microns, consisting essentially of a noncharge-transporting binder material and a charge-generating, charge-transporting squaric acid methine dye selected from the group consisting of compounds of the Formula I:

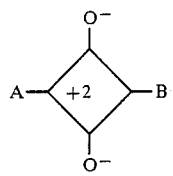

wherein A and B are independently

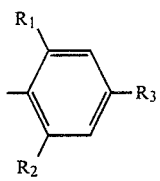

wherein $R_1$, $R_2$, $R_3$ are independently H, OH or alkyl of 1 to 6 carbon atoms, $NR_4R_5$, wherein $R_4$ and $R_5$ are independently alkyl of 1 to 6 carbon atoms;

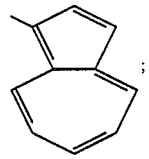

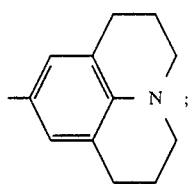

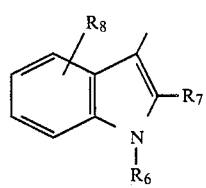

$R_6$ and $R_7$ independently alkyl of 1 to 6 carbon atoms; and $R_8$ is independently H, $OR_9$ or halogen and wherein $R_9$ is alkyl of 1 to 6 carbon atoms;

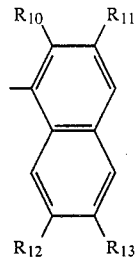

wherein $R_{10}$, $R_{11}$, $R_{12}$ and $R_{13}$ are independently H, OH or alkyl of 1 to 6 carbon atoms;

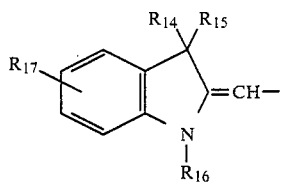

wherein $R_{14}$, $R_{15}$ and $R_{16}$ are independently alkyl of 1 to 6 carbon atoms and $R_{17}$ is independently OH, $OR_{18}$ or halogen, wherein $R_{18}$ is alkyl of 1 to 6 carbon atoms; or

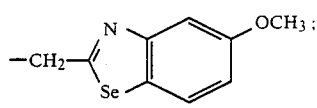

wherein the proportion of said dye to said binder material in said photoconductor is in the range of 1:1 to 1:40; and exposing said layer to an image pattern of radiation to which said layer is photosensitive.

6. A process according to claim 5 wherein A and B are independently.

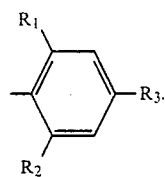

7. A process according to claim 6 wherein $R_1$ is methyl, $R_2$ is hydrogen, $R_3$ is dimethylamino and A and B are the same.

8. A process according to claim 5 wherein said binder is selected from the group consisting of polycarbonate resin, epoxy resins, and acrylic polymers.

* * * * *

UNITED STATES PATENT AND TRADEMARK OFFICE
CERTIFICATE OF CORRECTION

PATENT NO. : 4,500,621
DATED : February 19, 1985
INVENTOR(S) : Herbert K. Wurster It is certified that error appears in the above—identified patent and that said Letters Patent is hereby corrected as shown below:

In column 1, line 30, delete "discreate" and insert --discrete-- therefor; in line 34, delete "xeroxography" and insert --xerography-- therefor; in lines 38-39, delete "discreate" and insert --discrete-- therefor; and at line 64, delete "diffeent" and insert --different-- therefor.

In column 9, line 68, delete "independnetly" and insert --independently-- therefor.

In column 11, line 2, after the word "microns" and before the comma, insert --to an applied electric field--.

Signed and Sealed this

Ninth Day of December, 1986

*Attest:*

DONALD J. QUIGG

*Attesting Officer*  *Commissioner of Patents and Trademarks*